United States Patent
Mitsch

(10) Patent No.: US 8,746,663 B2
(45) Date of Patent: Jun. 10, 2014

(54) ELASTOMER SPRING WITH MECHANICALLY ADJUSTABLE STIFFNESS

(75) Inventor: Franz Mitsch, Heppenheim (DE)

(73) Assignee: FM Energie GmbH & Co. KG, Heppenheim (DE)

( * ) Notice: Subject to any disclaimer, the term of this patent is extended or adjusted under 35 U.S.C. 154(b) by 98 days.

(21) Appl. No.: 13/522,566

(22) PCT Filed: Jan. 13, 2011

(86) PCT No.: PCT/EP2011/000107
§ 371 (c)(1),
(2), (4) Date: Jul. 17, 2012

(87) PCT Pub. No.: WO2011/088965
PCT Pub. Date: Jul. 28, 2011

(65) Prior Publication Data
US 2012/0292840 A1  Nov. 22, 2012

(30) Foreign Application Priority Data

Jan. 19, 2010  (EP) .................................... 10000451

(51) Int. Cl.
*F16F 1/40*  (2006.01)
(52) U.S. Cl.
USPC ....... 267/294; 267/67; 267/140.4; 267/141.1; 267/257; 248/580; 248/638; 416/134 R; 416/140
(58) Field of Classification Search
CPC .............. F16F 1/40; F16F 1/403; F16F 1/41; F16F 1/46
USPC ................ 267/292, 294, 140.3, 140.2, 140.4, 267/141.1, 151, 152, 153, 257, 258, 201, 267/30, 66, 67; 248/557, 560, 580, 615, 248/638, 575, 578; 52/167.7, 167.8; 416/134 R, 132 B, 135, 140
See application file for complete search history.

(56) References Cited

U.S. PATENT DOCUMENTS

| 4,105,266 | A | * | 8/1978 | Finney | ........................... 267/152 |
| 6,443,439 | B1 | * | 9/2002 | Newman | ..................... 267/141.1 |
| 7,856,766 | B2 | * | 12/2010 | Takenoshita et al. | ......... 52/167.8 |
| 2007/0090269 | A1 | | 4/2007 | Bonnet | |
| 2008/0308980 | A1 | | 12/2008 | Mitsch | |

FOREIGN PATENT DOCUMENTS

| EP | 1 566 543 A1 | 8/2005 |
| EP | 1 887 248 A1 | 2/2008 |

* cited by examiner

*Primary Examiner* — Thomas J Williams
(74) *Attorney, Agent, or Firm* — Davis & Bujold, PLLC; Michael J. Bujold

(57) ABSTRACT

A mechanically adjustable elastomer bearing based on a correspondingly arranged spring element whose spring stiffness can be adjusted or pretensioned individually by deformable elastomer bodies or elastomer layers. The deformation of the elastomer layers, and thus of the spring elements, is achieved by a pressure-generated device which is fully integrated into the spring element. The elastomer bearing are particularly suitable for use as bearings in rotor and gearbox for large wind turbines, but can also advantageously be employed in machine and vehicle construction, and in particular package clutches.

15 Claims, 3 Drawing Sheets

ELASTOMER SPRING WITH MECHANICALLY ADJUSTABLE STIFFNESS

Figure 1:
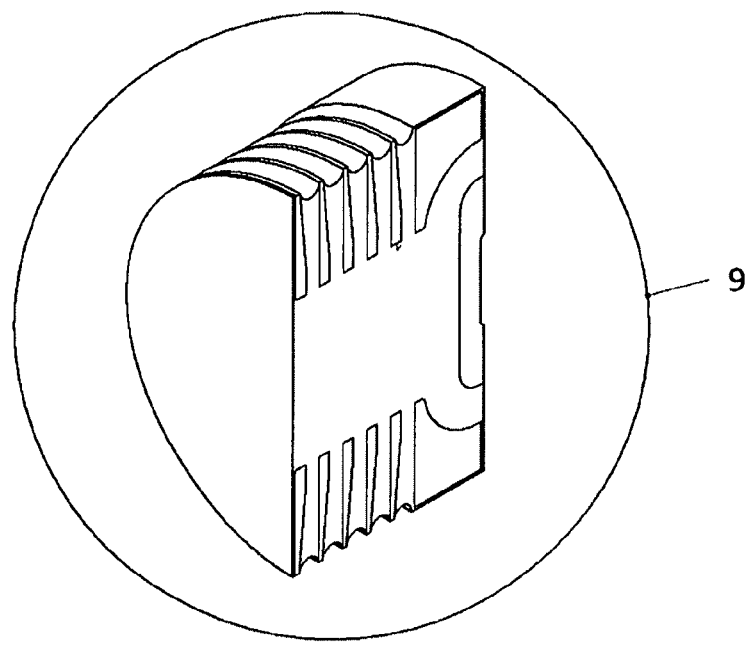

This application is a National Stage completion of PCT/EP2011/000107 filed Jan. 13, 2011, which claims priority from European patent application serial no. 10 000 451.4 filed Jan. 19, 2010.

FIELD OF THE INVENTION

The invention relates to a mechanically adjustable elastomer bearing based on correspondingly arranged spring elements whose spring stiffness can be individually adjusted or pretensioned by deformable elastomer bodies, or elastomer layers.

BACKGROUND OF THE INVENTION

The deformation of the elastomer layers and thus of the spring elements is achieved in accordance with the invention by a pressure-generating device which is fully integrated into the spring element. The pressure is generated here by tensioning devices which are installed and attached outside the spring element and are in contact with the pressure-generating device in the spring element. The elastomer bearings or elastomer spring elements according to the invention are particularly suitable for use in bearings in rotor and gearbox designs of large wind turbines, but can also advantageously be employed in machine and vehicle construction.

Elastic spring elements are known and are employed in many areas of technology, principally for damping vibrations and forces. The spring element here has a defined stiffness which is pre-specified by the type, size, shape and number of the elastomer layers present and in general cannot be changed or cannot be changed significantly after installation of the spring element.

In the case of large wind turbines with outputs of more than 2 megawatts, multipoint bearings are frequently employed which have to absorb and sufficiently damp the in some cases strong forces and vibrations occurring, in particular in relation to rotor blades and rotor shaft. The elastic bearing elements must therefore have relatively high stiffness. It is desirable here to have available elastomeric bearings in which the spring stiffness can be regulated or adjusted, if necessary even after installation in a turbine or device.

An elastomer bearing with adjustable stiffness is known, for example, from EP 1 566 543. In this application, a spring element is disclosed in which an elastomer layer is located between a connection plate and an end plate and optionally one or more intermediate plates, where the connection plate has an aperture with a connection part, through which pressure can be exerted on the elastomer layer by means of a displacement element in the form of a hydraulic fluid or movable piston element, and thus results in a change in the spring length of the spring element. In an embodiment here, the movable piston element essentially consists of a pressure piston having a more or less bulky piston head, which is generally covered with a hard elastomer layer. This piston head is [lacuna] by a pressure screw, which passed through a separate metal piece, which is attached to the actual spring element, so that, on screwing into the hollow thread in the metal piece, the piston head is forced into the region of the displacement elastomer of the spring element.

The design of the spring element here is matched to the shape and size of the pressure piston, which has the consequence that the production of the spring element is correspondingly more complex and thus more expensive, since the spring element must have a hollow shape corresponding to the piston. In practice, it has been found, in addition, that a piston of this type, which must be passed through the separate metal piece, often jams on tightening/loosening, so that fine adjustment of the spring stiffness frequently proves difficult, or is sometimes even impossible. In addition, problems arose in the meantime with uniform pressure distribution on the elastomeric spring element.

The object was thus to provide a corresponding spring element which functions in an analogous manner, but does not have the known disadvantages described of the corresponding bearings of the prior art.

The object has been achieved by the provision of a spring element as described below and in the claims.

SUMMARY OF THE INVENTION

The invention thus relates to a spring element (9) of adjustable stiffness which essentially comprises an elastomeric damping element (15) and an elastomeric pressure element (16), both of which are preferably in a closed integral design. In principle, however, it is also possible for damping element and pressure element to be separate units, which are joined to one another and are held together, preferably reversibly, by further attachment means.

The damping element essentially consists of an elastomer part (1) (2), which is limited at the bottom by a lower terminal plate (13) and at the top by the adjacent pressure-stable pressure element (16), and has in the interior one or more non-elastic intermediate plates (14) which are arranged parallel to the lower terminal plate and are separated from one another by elastomer layers (2). The intermediate plates have a cylindrical hole (3) which is arranged in accordance with the vertical axis of the spring element and is filled by an elastomer core or elastomer volume (1).

The pressure element (16) is or essentially comprises a pressure-stable, preferably metallic bowl (4), which has in its base a cylindrical hole which is congruent with the hole (3) of the damping element. The bowl provided with said hole in its base is filled by compressible elastomer material (5) and a pressure piece (6), where the pressure piece (6) in the non-pretensioned state of the spring element forms a part of the upper limit (12) of the pressure element (16) and is surrounded at the sides and below by, or is embedded in, elastomeric compression material (5). This elastomer material (5) of the pressure bowl (4) is, as described, in direct contact with the elastomer core (1) of the damping element (15), so that the pressure mediated via the pressure piece (6) is transmitted to the actual damping unit (15), and a change in the spring length of the damping element (15) is thus achieved, depending on the pressure exerted.

In a particular and particularly advantageous embodiment of the invention, the preferably metallic pressure bowl (4) has on the upper surface (12) an aperture which is shaped in such a way that the preferably disc-shaped pressure piece (6) passes through this aperture with a close fit and in a flush manner, but where space is additionally provided for a separation join or a separation gap (19), which is likewise filled with elastomer material (5). The elastomer material in this region is, in accordance with the invention, not firmly connected to the edge of the aperture of the pressure bowl (4), but instead only lies against it. The elastomer material preferably also lies only loosely in the upper region of the pressure bowl below the aperture for the pressure piece, i.e. is not firmly connected to the pressure-bowl wall in this upper region, in contrast to the lower region of the pressure bowl. The upper region of the pressure bowl in which the elastomer only lies loosely against it is to be regarded as being about 10 to a maximum of 50% of the thickness of the pressure-bowl element, preferably 10 to 30%, in particular 20-30%. By contrast, the elastomer material (5) in the region of the separation gap (19) and in the region below this is, in accordance with the invention, firmly connected to the pressure piece (6) (vulcanisation, adhesive bonding, etc.), so that the pressure piece as a whole is completely surrounded by elastomer material (5) and is preferably permanently surrounded thereby on its lateral and lower surface extending into the spring element.

Figure 3:
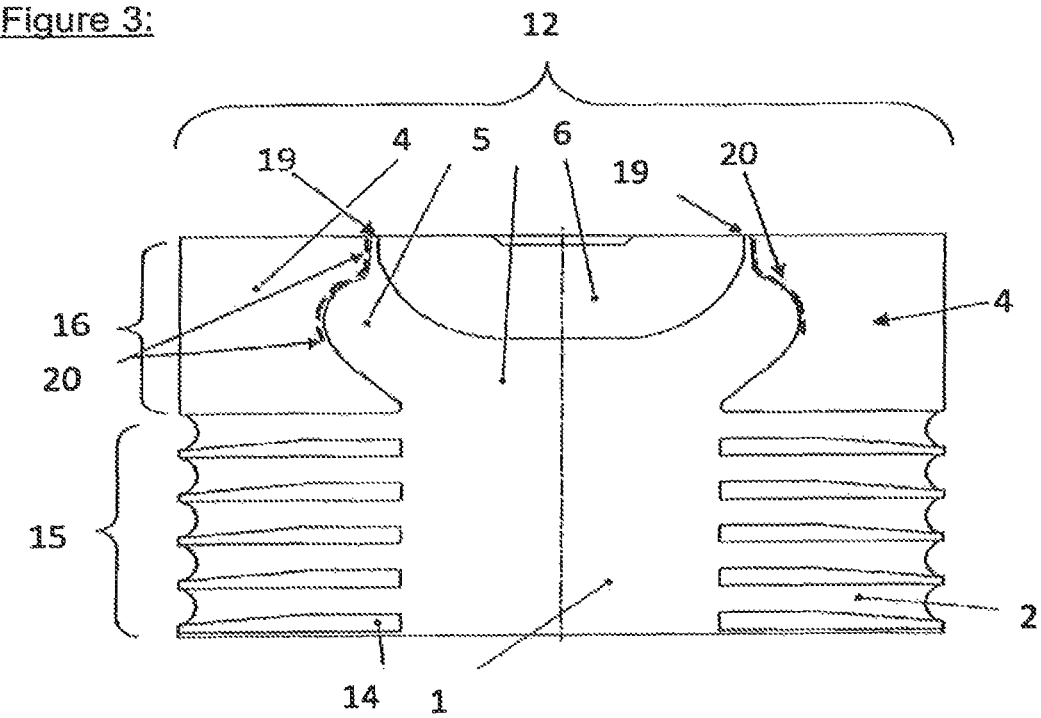
Figure 4:
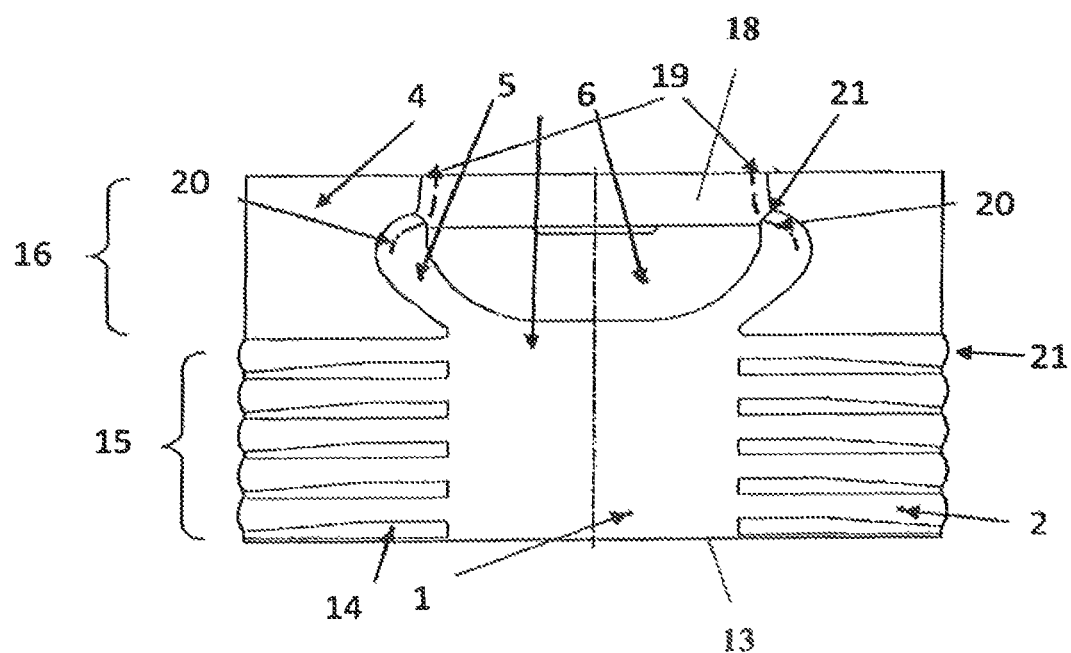

The separation gap (19) is, in accordance with the invention, sufficiently small that, on introduction of the pressure piece, no or essentially no elastomer material is forced upwards beyond the limiting surface (12) of the pressure element (4) via a pressure-generating device (18), but instead the pressure results completely or essentially completely in compression of the elastomer material (5) and (1) in the spring element (9) itself (FIGS. 3, 4). It is only thus that optimum fine adjustment of the pretension of the spring element can be achieved. In accordance with the invention, the circumferential separation gap is between 1 and 10 mm, preferably between 2 and 5 mm thick. In the said embodiment, the pressure element (4) advantageously does not have the shape of a typical bowl, but instead, owing to the narrow upper aperture and the adequate elastomer volume (5) necessary, preferably has a bulbous shape in cross section, as depicted in FIGS. 3 and 4.

Figure 2:
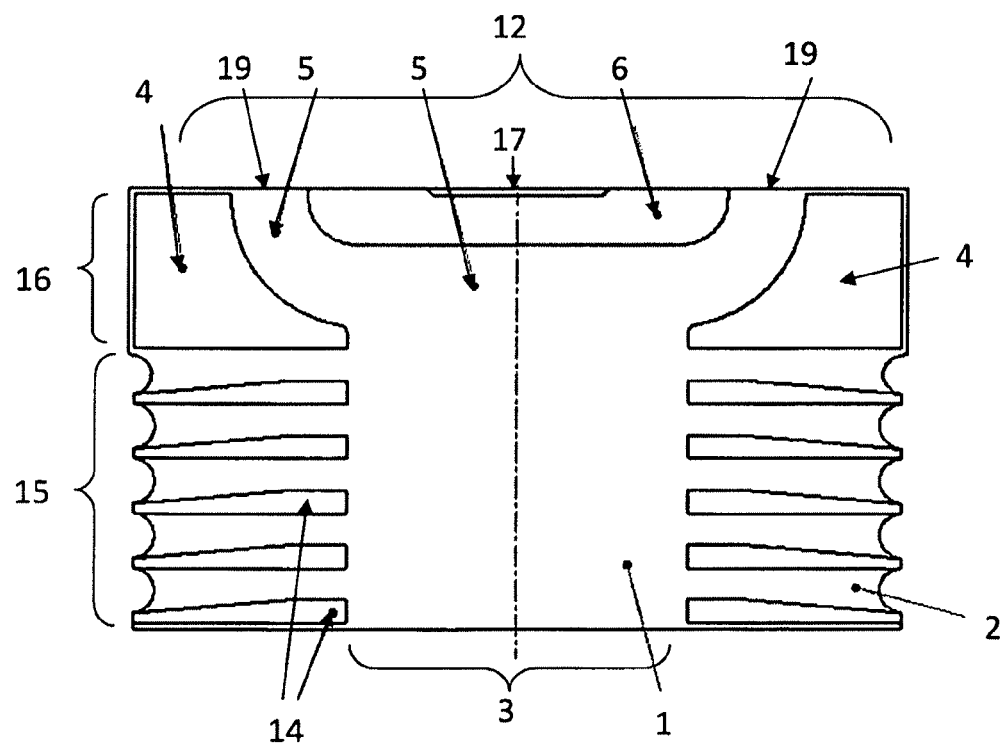

In a further embodiment, the pressure element (4) may also have the shape of a typical bowl depicted in FIGS. 1 and 2, where the separation between the edge of the upper aperture of the component and the edge of the pressure piece (6) mounted in the aperture should again be kept as small as possible (preferably 5-20 mm) in order that excessive elastomer is not forced upwards through the separation gap (19) during compression.

The invention furthermore relates to the use of a spring element in this respect for damping vibrations through dynamic adjustability of the stiffness of elastomer layers in bearing components in machines, vehicles and wind turbines.

In particular, the bearing is suitable for use in package clutches, as depicted, for example, in FIG. 3 or 4.

An advantage of the bearing according to the invention is that no sliding parts, as in the press bolt solution of EP 1 566 543, are necessary. In the bearing according to the invention, the press bolt instead represents an integral functional unit together with the rubber/metal element, the actual damping element (15), in which long distances and/or a relatively large space requirement are not necessary.

The invention is described in greater detail below.

BRIEF DESCRIPTION OF THE FIGURES SHOWN

FIG. 1: perspective view of the spring element according to the invention

FIG. 2: longitudinal section through an elastomeric spring element in accordance with the invention which has a broad separation gap (19).

FIG. 3: longitudinal section through an elastomeric spring element in accordance with the invention which, has a narrow separation gap (19) in the untensioned state.

FIG. 4: longitudinal section through an elastomeric spring element in accordance with the invention which, has a narrow separation gap (19) in the pretensioned state.

Figure 5:
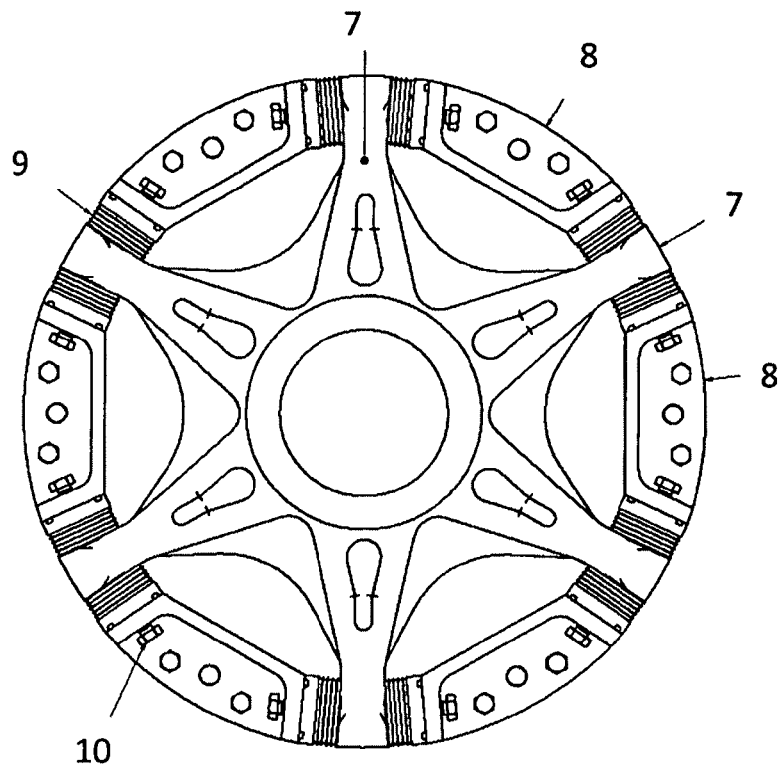

FIG. 5: package clutch with installed spring element according to the invention.

Figure 6:
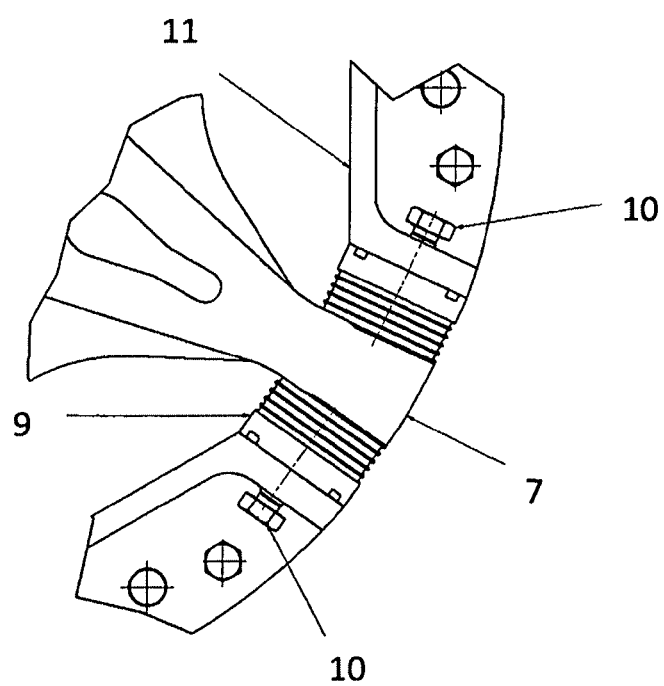

FIG. 6: partial segment of FIG. 4.

DETAILED DESCRIPTION OF THE PREFERRED EMBODIMENTS

The reference numerals used in the figures and description have the meanings laid down in the following table:

| Reference numeral | Meaning |
| --- | --- |
| (1) | Elastomer volume damping element, middle |
| (2) | Elastomer volume damping element, between the plates |
| (3) | Hole in intermediate plates, region adopted by the elastomer (1) |
| (4) | Pressure bowl |
| (5) | Elastomer volume in the region of the pressure bowl (4) and the separation gap |
| (6) | Pressure piece |
| (7) | Star package clutch |
| (8) | Counterpiece star package clutch |
| (9) | Spring element according to the invention (in full) |
| (10) | Attachment screw package clutch |
| (11) | Screw flange |
| (12) | Upper limiting surface of the spring element |
| (13) | Lower terminal plate |
| (14) | Intermediate plate spring element in damping element |
| (15) | Damping element |
| (16) | Pressure element |
| (17) | Support surface/attachment |
| (18) | Tensioning device on (17) |
| (19) | Separation gap, filled with elastomer material |
| (20) | Region with no connection of elastomer layer (5) to pressure bowl (4) |
| (21) | Elastomer bead produced by pretension |

A typical spring element in accordance with the invention is depicted in FIGS. 1-4.

The spring element in these embodiments is preferably designed as a component with a round or rectangular cross section, but may also adopt other shapes and design. FIG. 1 shows a terminal plate which is round here.

Above the termination plate (13) is an elastomer layer (1) having a thickness, depending on the size of the element, generally between approximately 1 and 10 cm. Larger and smaller elements are in principle possible. The elastomer layer is firmly connected to the plate (13) and is also distributed (2) between the element-stabilising intermediate plates (14), to which it is optionally likewise firmly connected (adhesive bonding/vulcanisation).

The elastomer volume (1) is directly connected to the elastomeric compression volume (5) in the bowl (4) of the pressure unit (16). The pressure bowl (4) and the pressure unit (16) are made of pressure-resistant material, preferably metal. The intermediate plates (14) are preferably likewise also made of metal, but may also be replaced by other hard materials which have a certain bending ability. The intermediate plates are preferably designed in the shape of broad ring plates, whose mid point is preferably located at the level of the pressure piece (6) or the hole in the pressure bowl (4).

In the edge region, the elastomer layer (2) has concave or convex contours between the plates, which can change depending on the compression state. Apart from in the region around the connectors which has already been mentioned, the elastomer layer is firmly connected to the edge and intermediate plates involved, for example by adhesive bonding or vulcanisation.

A novel feature compared with the spring element of EP 1 566 543 is the pressure unit (16), which is firmly connected to the elastomeric spring element (15) and forms a closed component therewith. This pressure unit, which is arranged opposite the terminal plate (13) and terminates the entire spring element (9) at the top, essentially comprises a pressure-resistant bowl, preferably made of metal, which has a diameter which is at least as large as the diameter of the cylindrical hole of the intermediate plates, or of the elastomer volume (1). The base of the bowl (4) likewise has an aperture whose diameter preferably corresponds to the diameter of the said cylindrical hole of the intermediate plates (14). The interior of the bowl is filled with the elastomeric compression volume (5). This elastomer is softer or at least precisely as hard with respect to its stiffness as the elastomer volume (1) (2) of the actual spring element, which is directly in contact with it.

In the centre at the upper outward-facing edge of the spring element (9), the compression volume (5) comprises a pressure piece (6), which, in the simplest case, is a solid pressure-stable round, square or differently shaped sheet or plate. This pressure piece is either located on the compression elastomer (5) or is connected thereto, or alternatively is preferably embedded therein, so that its underside and side surfaces are surrounded by the elastomer (5), while the upper side forms a flush termination with the upper contour of the spring element (9).

Pressure is exerted specifically and adjustably on this outward-facing surface of the pressure piece in accordance with the invention by means of a tensioning device (18), so that the pressure piece (6) is forced into the compression volume. The displaced material of the elastomer (5) in the pressure bowl (4) thus compresses the elastomer/intermediate plate construction of the actual damping element (15) in accordance with the pressure exerted, enabling the stiffness of this component to be adjusted specifically and simply. The tensioning device can be of a mechanical or hydraulic nature.

In order that the pressure exerted by the pressure piece (6) does not force elastomer material (5) out of the pressure bowl (4) upwards or outwards out of the component, and can thus be transmitted to the actual damping unit (15), the component according to the invention is either installed correspondingly in the device to be damped in such a way that squeezing-out is prevented, or alternatively the spring element additionally comprises an upper terminal plate which has an aperture which is shaped and arranged correspondingly in accordance with the pressure piece (6), so that no elastomer material can be forced upwards out of the pressure bowl on pressing via the pressure piece (6). A terminal plate of this type either forms a fixed unit with the spring element or is detachably connected thereto, for example by means of a screw connection.

The pressure piece (6) should be dimensioned in such a way that, although it is sufficiently large for accommodation of the tensioning device (18), it should still, however, leave sufficient space in the pressure bowl (4) for the surrounding compression elastomer (5), so that this can be compressed adequately without the pressure piece touching the base of the pressure bowl (4) in the process.

The pressure piece (6) itself can have a support surface or a holding device for the tensioning device (18). In the simplest case, this comprises a screw or bolt which is moved in a thread outside the spring element (9) in the direction of the pressure piece and forces the latter into the compression volume (5).

The elastomer materials used in accordance with the invention for components (15) and (16) essentially consist of a natural rubber, a natural rubber derivative or of a suitable elastic polymeric plastic or plastic mixture. The elastomer layer may in accordance with the invention have different hardness ("Shore hardness") and different damping properties, in accordance with the desired requirements. Elastomers having a hardness of 20 to 100 Shore A, in particular 30 to 80 Shore A, are preferably used. The preparation of such elastomers of different hardness is known in the prior art and is adequately described in the relevant literature. Preference is given to the use of commercially available natural rubbers or plastics.

The elastomer material in the pressure bowl (4) or the pressure element (16) preferably has lower stiffness than the elastomeric material of the damping element (15).

In accordance with the invention, the non-elastomeric intermediate plates (2) are made of substantially non-elastic materials having low compressibility. These are preferably metal sheets, but other materials, such as hard plastics, composite materials or carbon fibre-containing materials, can also be employed. The intermediate metal sheets and the elastomer materials (4) are generally connected to one another by vulcanisation.

As already mentioned, the spring elements according to the invention that have been described are particularly suitable for use as bearing points in machines, vehicles, but preferably in wind turbines.

The spring elements according to the invention are furthermore also eminently suitable as damping elements in package clutches (FIGS. 5, 6).

The invention claimed is:

1. An elastic spring element (9) of adjustable stiffness, the elastic spring element (9) comprising:
   (a) an elastomeric damping element (15), and
   (b) an elastomeric pressure element (16), where
      (i) the damping element substantially comprises an elastomer core and elastomer layers (1, 2) and is limited at a bottom thereof by a lower terminal plate (13) and at a top thereof by the pressure element (16), and the damping element has, in an interior thereof, one or more non-elastic intermediate plates (14) which are arranged parallel to the lower terminal plate and are separated from one another by the elastomer layers (2) and which have a cylindrical hole (3) which is arranged in accordance with a vertical axis of the spring element and is filled by the elastomer core (1), and
      (ii) the pressure element (16) has a shape of a pressure-stable bowl (4), which has in its base a central hole which is congruent with the adjacent cylindrical hole (3) of the damping element, and is filled by a compressible elastomer material (5) and a pressure piece (6), where the pressure piece (6) in a non-pretensioned state of the spring element forms a part of an upper horizontal limit (12) thereof and is either surrounded at sides and a bottom thereof by, or is embedded in, the compressible elastomer material (5) which is in direct contact with the elastomer core (1) of the damping element (15), so that pressure mediated, via the pressure piece (6), is transmitted to the damping unit (15), and a change of spring length of the damping element (15) is thus achieved by compression of the elastomer core (1), depending on the pressure exerted.

2. The elastic spring element according to claim 1, wherein the pressure-stable bowl (4) and the pressure piece (6) are separated, in a region of the upper horizontal limit (12), by a circumferential separation gap (19) which is filled with the compressible elastomer material (5).

3. The elastic spring element according to claim 2, wherein the separation gap (19) has a thickness of between 2-5 mm.

4. The elastic spring element according to claim 1, wherein the compressible elastomer material (5), in a region of the separation gap (19) and an upper part of the pressure-stable bowl (4), is loosly connected to an inside wall of the pressure-stable bowl (4).

5. The elastic spring element according to claim 4, wherein the compressible elastomer material (5), in a lower part of the pressure-stable bowl (4), is firmly connected to the inside wall of the pressure-stable bowl (4) in this region.

6. The elastic spring element according to claim 1, wherein the compressible elastomer material (5) is firmly connected to the pressure piece (6).

7. The elastic spring element according to claim 1, wherein the pressure piece (6) has either a support surface or an attachment unit (17) for a tensioning device (18), which is located outside the spring element.

8. The elastic spring element according to claim 7, wherein a thickness of the compressible elastomer material (5) of the pressure element (16) is at least twice as large as a maximum compression distance by which the pressure piece (6) is forced in a direction of the damping element (15) by the tensioning device (18).

9. The elastic spring element according to claim 1, wherein an outer shape of the pressure piece (6) mirrors an inner shape of the pressure-stable bowl (4) of the pressure element (16).

10. The elastic spring element according to claim 1, wherein the damping element (15) and the pressure element (16) have either a substantially round or rectangular outer shape.

11. The elastic spring element according to claim 1, wherein the pressure piece (6) has a substantially round or rectangular outer shape.

12. The elastic spring element according to claim 1, wherein the elastomer core, the compressible elastomer material (1 and 5) and the pressure piece (6) are arranged centrally in a middle of the spring element (9).

13. The elastic spring element according to claim 1, wherein the damping element (15) and the pressure element (16) are formed as a closed integral design.

14. The elastic spring element according to claim 1, wherein the compressible elastomer material of the pressure element (16) has a lower stiffness than elastomer material of the elastomer core of the damping element (15).

15. The elastic spring element according to claim 1, wherein the elastic spring element is incorporated in a bearing of one of a rotor and a gearbox component for either a wind turbine or a package clutch for one of a vehicle and a machine.

* * * * *